US010565846B2

(12) United States Patent
Lui

(10) Patent No.: US 10,565,846 B2
(45) Date of Patent: Feb. 18, 2020

(54) SYSTEMS AND METHODS FOR A MACHINE LEARNING BABY MONITOR

(71) Applicant: Benjamin Lui, Austin, TX (US)

(72) Inventor: Benjamin Lui, Austin, TX (US)

( * ) Notice: Subject to any disclaimer, the term of this patent is extended or adjusted under 35 U.S.C. 154(b) by 228 days.

(21) Appl. No.: 15/796,574

(22) Filed: Oct. 27, 2017

(65) Prior Publication Data

US 2019/0130720 A1  May 2, 2019

(51) Int. Cl.
| | |
|---|---|
| *G06K 9/00* | (2006.01) |
| *G08B 21/02* | (2006.01) |
| *H04N 7/18* | (2006.01) |
| *G10L 25/57* | (2013.01) |
| *G10L 25/63* | (2013.01) |
| *G06K 9/66* | (2006.01) |
| *G06K 9/46* | (2006.01) |
| *G08B 21/04* | (2006.01) |
| *G10L 25/21* | (2013.01) |

(52) U.S. Cl.
CPC ..... *G08B 21/0208* (2013.01); *G06K 9/00302* (2013.01); *G06K 9/00771* (2013.01); *G06K 9/4628* (2013.01); *G06K 9/66* (2013.01); *G08B 21/0407* (2013.01); *G08B 21/0446* (2013.01); *G10L 25/21* (2013.01); *G10L 25/57* (2013.01); *G10L 25/63* (2013.01); *H04N 7/183* (2013.01)

(58) Field of Classification Search
CPC ..... G08B 21/0208; G10L 25/57; G10L 25/63; G06K 9/00302; G06K 9/00771; G06K 9/4628; G06K 9/66; H04N 7/183
See application file for complete search history.

(56) References Cited

U.S. PATENT DOCUMENTS

| | | | |
|---|---|---|---|
| 9,441,759 B1 * | 9/2016 | Bley | F16M 11/045 |
| 2015/0288877 A1 | 10/2015 | Glazer | |
| 2016/0364617 A1 * | 12/2016 | Silberschatz | G06K 9/00771 |
| 2017/0076571 A1 * | 3/2017 | Borel | G08B 13/19669 |
| 2018/0078871 A1 * | 3/2018 | Monge Nunez | A63H 33/006 |

\* cited by examiner

*Primary Examiner* — Ping Y Hsieh
(74) *Attorney, Agent, or Firm* — Seed IP Law Group LLP; Jeremiah J. Baunach

(57) ABSTRACT

Systems and methods for a machine learning baby monitor may include a deep learning baby monitor that can recognize one's baby and monitor the baby's emotions. The components of the baby monitor and baby monitor operation manager facilitate the detection of different states and positions the baby is in based on analyses of images of the baby captured by the baby monitor using machine learning techniques and communicate information regarding such detection, such as alerts to remote devices, such as mobile devices of a user.

23 Claims, 12 Drawing Sheets

SYSTEMS AND METHODS FOR A MACHINE LEARNING BABY MONITOR

TECHNICAL FIELD

The technical field relates to video monitoring, and particularly to video monitoring systems for babies.

BRIEF SUMMARY

According to one example embodiment, a system and method for a machine learning baby monitor classifies images into 5 categories: baby awake, baby asleep, baby crying, baby's face is covered, and no baby. "Face covered" means baby monitor sees a baby's head but cannot clearly see the nose or mouth. The classifications may occur, for example, every 3-4 seconds and are displayed as part of the notifications within a user interface of an application running on a user's mobile device. The system enables the rate of classifications to be adjusted. According to one embodiment, while the video stream is running, an image is generated from the video stream and classified with a neural network every 3 seconds. The classification corresponds to a state the baby is in and displayed on a user interface screen, such as on a user's mobile device. The classifications are displayed to the user along with timestamps and confidence percentages as part of the notification. This allows the user to see the baby monitor is actively monitoring their baby. The classification display may be toggled on and off by the user.

A computerized method for monitoring safety of a baby may be summarized as including capturing, by at least one computer processor, digital video of the baby over a period of time; generating, by at least one computer processor, a plurality of digital images of the baby over the period of time based on the captured digital video; analyzing, by at least one computer processor, the plurality of digital images during the period of time; detecting, by at least one computer processor, a plurality of different states the baby is in during the period of time based on the analysis of the plurality of digital images; and electronically communicating wirelessly to a mobile device of a user, during the period of time, by at least one computer processor, information regarding the plurality of different states the baby is in during the period of time based on the analysis of the plurality of digital images. The detecting, by at least one computer processor, the plurality of different states the baby is in during the period of time based on the analysis of the plurality of digital images may include at least one computer processor selecting between the following states based on the analysis of the plurality of digital images: baby awake, baby asleep, baby crying, baby's face is covered and no baby. The detecting, by at least one computer processor, the plurality of different states the baby is in during the period of time based on the analysis of the plurality of digital images may include at least one computer processor determining, based on the analysis of the plurality of digital images, that the baby had been in each of the following states over the period of time: awake, asleep, crying and face is covered. The detecting, by at least one computer processor, the plurality of different states the baby is in during the period of time based on the analysis of the plurality of digital images may include at least one computer processor selecting at least one of the following states based on the analysis of the plurality of digital images: baby awake, baby asleep, baby crying, baby's face is covered and no baby. The selecting at least one of the following states based on the analysis of the plurality of digital images: baby awake, baby asleep, baby crying, baby's face is covered and no baby, may include detecting a plurality of different positions the baby is in during the period of time based on the analysis of the plurality of digital images.

The detecting a plurality of different positions the baby is in during the period of time based on the analysis of the plurality of digital images may include training, by at least one computer processor, a convolutional multi-layer neural network to detect the plurality of different positions of the baby by training the convolutional multi-layer neural network using a database of images representative of the plurality of different positions of the baby, each different position representative of a corresponding different one the states: baby awake, baby asleep, baby crying and baby's face is covered; and based on the analysis of plurality of digital images during the period of time, determining which of the plurality of digital images during the period of time corresponds to which of the plurality of different positions of the baby. The electronically communicating wirelessly to a mobile device, during the period of time, information regarding the plurality of different states the baby is in during the period of time based on the analysis of the plurality of digital images may include periodically sending status reports to be displayed on the mobile device of the user, each status report indicating a current state the baby is in of the plurality of different states at the time the status report is sent based on the analysis of the plurality of digital images along with a timestamp indicating a time at which the baby was in the current state. Each of the status reports to be displayed on the mobile device of the user indicating the current state the baby is in may include a percentage of confidence indicating how likely the indication of the current state is accurate.

The method may further include receiving, by at least one processor, input from the user to adjust a frequency at which the status reports to be displayed on the mobile device of the user indicating the current state the baby are to be sent; and adjusting, by at least one processor, the frequency at which the status reports to be displayed on the mobile device of the user indicating the current state the baby are to be sent based on the received input from the user to adjust the frequency. The electronically communicating wirelessly to a mobile device information regarding the plurality of different states the baby is in during the period of time based on the analysis of the plurality of digital images may include sending status reports to be displayed on the mobile device of the user each time and in response to a different state of the baby being detected during the period of time based on the analysis of the plurality of digital images, each status report indicating a current state the baby is in of the plurality of different states at a time the status report is sent.

The method may further include causing, by at least one processor, live digital video of the baby to be displayed on the mobile device of the user along with the status reports indicating the current state the baby is in.

The method may further include detecting, by at least one computer processor, that the baby is present based on the analysis of the plurality of digital images; receiving, by at least one processor, audio signal resulting from the baby making a sound; correlating, by at least one processor, a timestamp associated with a digital image of the plurality of digital images indicating the baby is present with a time at which the audio signal was received resulting from the baby making the sound; determining, by at least one processor, that the baby was present when the audio signal resulting from the baby making the sound was received based on the correlation of the timestamp associated with the digital image of the plurality of digital images indicating the baby is present with the time at which the audio signal was received resulting from the baby making the sound; determining, by at least one processor, that the volume of the audio signal resulting from the baby making the sound is above a threshold; and in response to determining that the volume of the audio signal resulting from the baby making the sound is above a threshold, at least one processor electronically communicating an alert based on the determination that the baby was present when the audio signal resulting from the baby making the sound was received.

The method may further include receiving, by at least one processor, input from the user to adjust the threshold; adjusting the threshold based on the received input from the user to adjust the threshold; determining, by at least one processor, that the volume of an additional audio signal resulting from the baby making an additional sound is above the adjusted threshold; and in response to determining that the volume of the additional audio signal resulting from the baby making the additional sound is above the adjusted threshold, at least one processor electronically communicating another alert based on a determination that the baby was present when the additional audio signal resulting from the baby making the additional sound was received.

A baby monitor may be summarized as including at least one memory; at least one processor coupled to the at least one memory; and at least one video camera coupled to the at least one processor, wherein the at least one memory has computer-executable instructions stored thereon that, when executed, cause the at least one processor to: cause the video camera to capture digital video of the baby over a period of time; generate a plurality of digital images of the baby over the period of time based on the captured digital video; analyze the plurality of digital images during the period of time; detect a plurality of different states the baby is in during the period of time based on the analysis of the plurality of digital images; and electronically communicate wirelessly to a mobile device of a user, during the period of time, information regarding the plurality of different states the baby is in during the period of time based on the analysis of the plurality of digital images. The detecting the plurality of different states the baby is in during the period of time based on the analysis of the plurality of digital images may include selecting at least one of the following states based on the analysis of the plurality of digital images: baby awake, baby asleep, baby crying, baby's face is covered and no baby. The selecting at least one of the following states based on the analysis of the plurality of digital images: baby awake, baby asleep, baby crying, baby's face is covered and no baby, may include detecting a plurality of different positions the baby is in during the period of time based on the analysis of the plurality of digital images.

The detecting a plurality of different positions the baby is in during the period of time based on the analysis of the plurality of digital images may include training a convolutional multi-layer neural network to detect the plurality of different positions of the baby by training the convolutional multi-layer neural network using a database of images representative of the plurality of different positions of the baby, each different position representative of a corresponding different one the states: baby awake, baby asleep, baby crying and baby's face is covered; and based on the analysis of plurality of digital images during the period of time, determining which of the plurality of digital images during the period of time corresponds to which of the plurality of different positions of the baby.

The electronically communicating wirelessly to a mobile device, during the period of time, information regarding the plurality of different states the baby is in during the period of time based on the analysis of the plurality of digital images may include periodically sending status reports to be displayed on the mobile device of the user, each status report indicating a current state the baby is in of the plurality of different states at the time the status report is sent based on the analysis of the plurality of digital images along with a timestamp indicating a time at which the baby was in the current state.

The baby monitor may further include a flexible gooseneck arm coupled to the video camera at a first end of the flexible gooseneck arm; and a clamp coupled to a second end of the flexible gooseneck arm configured to clamp on a baby crib.

A non-transitory computer-readable storage medium, having computer executable instructions stored thereon that, when executed by the at least one processor, may cause the at least one processor to: cause the video camera to capture digital video of the baby over a period of time; generate a plurality of digital images of the baby over the period of time based on the captured digital video; analyze the plurality of digital images during the period of time; detect a plurality of different states the baby is in during the period of time based on the analysis of the plurality of digital images; and electronically communicate wirelessly to a mobile device of a user, during the period of time, information regarding the plurality of different states the baby is in during the period of time based on the analysis of the plurality of digital images. The detecting the plurality of different states the baby is in during the period of time based on the analysis of the plurality of digital images may include selecting at least one of the following states based on the analysis of the plurality of digital images: baby awake, baby asleep, baby crying, baby's face is covered and no baby. The selecting at least one of the following states based on the analysis of the plurality of digital images: baby awake, baby asleep, baby crying, baby's face is covered and no baby, may include detecting a plurality of different positions the baby is in during the period of time based on the analysis of the plurality of digital images.

The non-transitory computer-readable storage medium of claim 22 wherein the detecting a plurality of different positions the baby is in during the period of time based on the analysis of the plurality of digital images may include training a convolutional multi-layer neural network to detect the plurality of different positions of the baby by training the convolutional multi-layer neural network using a database of images representative of the plurality of different positions of the baby, each different position representative of a corresponding different one the states: baby awake, baby asleep, baby crying and baby's face is covered; and based on the analysis of plurality of digital images during the period of time, determining which of the plurality of digital images during the period of time corresponds to which of the plurality of different positions of the baby.

The electronically communicating wirelessly to a mobile device, during the period of time, information regarding the plurality of different states the baby is in during the period of time based on the analysis of the plurality of digital images may include periodically sending status reports to be displayed on the mobile device of the user, each status report indicating a current state the baby is in of the plurality of different states at the time the status report is sent based on the analysis of the plurality of digital images along with a timestamp indicating a time at which the baby was in the current state.

The computer executable instructions, when executed, may further cause the at least one processor to: detect that the baby is present based on the analysis of the plurality of digital images; receive audio signal resulting from the baby making a sound; correlate a timestamp associated with a digital image of the plurality of digital images indicating the baby is present with a time at which the audio signal was received resulting from the baby making the sound; determine that the baby was present when the audio signal resulting from the baby making the sound was received based on the correlation of the timestamp associated with the digital image of the plurality of digital images indicating the baby is present with the time at which the audio signal was received resulting from the baby making the sound; determine that the volume of the audio signal resulting from the baby making the sound is above a threshold; and in response to a determination that the volume of the audio signal resulting from the baby making the sound is above a threshold, electronically communicate an alert based on the determination that the baby was present when the audio signal resulting from the baby making the sound was received.

BRIEF DESCRIPTION OF THE DRAWINGS

The components in the drawings are not necessarily to scale relative to each other. Like reference numerals designate corresponding parts throughout the several views.

DETAILED DESCRIPTION

Systems and methods for a machine learning baby monitor may include a deep learning baby monitor that can recognize one's baby and monitor the baby's emotions. Deep learning is a type of machine learning, which is a superset of deep learning. Although the example embodiment is built with deep learning techniques, other embodiments may use other machine learning techniques. Currently, sudden Infant Death Syndrome (SIDS) is a scary prospect that has no known root cause. SIDS is one of the leading causes of death in babies less than one year old. The risk of SIDS decreases when infants are placed on their backs to sleep, instead of face-down on their stomachs. According to one embodiment, the systems and methods for a machine learning baby monitor described herein use a convolutional neural network (CNN) that is trained on thousands of baby images in various positions and conditions. Current baby monitors do not detect positions or emotions of one's baby. Currently, the more advanced baby monitors on the market require attachable sensors on the baby to achieve breathing and heart-rate monitoring. However, the systems and methods for a machine learning baby monitor described herein catch issues with the baby before he or she has problems breathing or has a low heart-rate, which is more valuable to the parent. In addition, movement and sound detection is also performed by the systems and methods for a machine learning baby monitor in combination with other features to provide earlier detection and notification of safety issues regarding the baby than traditional baby monitors.

Figure 1:
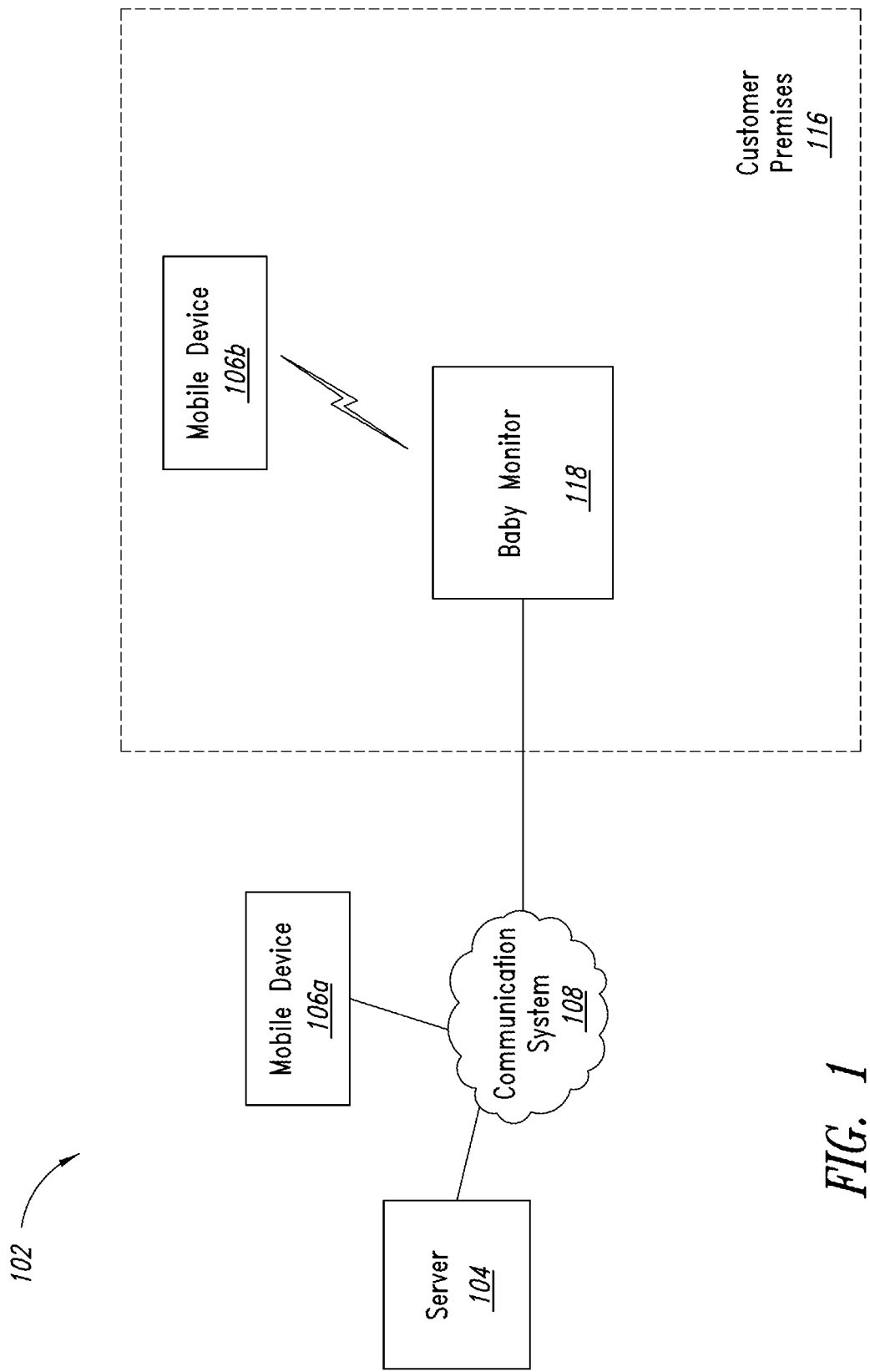
FIG. 1 is an overview block diagram illustrating an example technological environment in which embodiments of systems and methods for a machine learning baby monitor may be implemented, according to one example embodiment.

FIG. 1 is an overview block diagram illustrating an example technological environment in which embodiments of systems and methods for a machine learning baby monitor may be implemented, according to one example embodiment. Before providing additional details regarding the operation and constitution of systems and methods for a machine learning baby monitor, the example technological environment 102, within which such systems and methods may operate, will briefly be described.

In the technological environment 102, the baby monitor 118 interconnects to one or more servers, such as, for example, server 104 and mobile devices, such as, for example, mobile device 106a and 106b, to send and receive data regarding the monitoring of the baby on the customer premises 116, including, but not limited to, video, images, audio, notification and alert data, analytics, results of image analyses, user interfaces and related data, measurements, detected states the baby is in, machine learning models, sets of training data and verification data regarding machine learning. For example, the various data may be delivered using the Internet protocol (IP) suite over a packet-switched network such as the Internet or other packet-switched network or a peer-to-peer network, such as Bluetooth. The underlying connection carrying such data may be via a cable head-end, satellite antenna, telephone company switch, cellular telephone system, short range radio channel, Ethernet portal, off-air antenna, or the like. The baby monitor 118 may receive a plurality of data by way of the server 104 and mobile devices 106a and 106b, or may only receive data via a particular channel or source. This data may be received or formatted by the baby monitor in various different formats.

Accordingly, the baby monitor 118 may be any suitable device or electronic equipment that is operable to receive and process images, video and/or audio of the baby and process and communicate data regarding the images, video and/or audio as described herein. Further, the baby monitor 118 may itself include user interface devices, such as one or more displays and virtual or physical buttons or switches.

Data may be communicated between the baby monitor 118, the server 104 and mobile device 106a through suitable communication media, generally illustrated as communication system 108 for convenience. Communication system 108 may include many different types of communication media including those utilized by various different physical and logical channels of communication, now known or later developed. Non-limiting media and communication channel examples include one or more, or any operable combination of, telephone systems, the Internet, cable systems, fiber optic systems, microwave systems, asynchronous transfer mode ("ATM") systems, frame relay systems, digital subscriber line ("DSL") systems, radio frequency ("RF") systems, cellular systems, and satellite systems.

The above description of the technological environment 102, the customer premises 116, and the various devices therein, is intended as a broad, non-limiting overview of an example environment in which various embodiments of a machine learning baby monitor may be implemented. FIG. 1 illustrates just one example of a technological environment 102 and the various embodiments discussed herein are not limited to such environments. In particular, technological environment 102 and the various devices therein, may contain other devices, systems and/or media not specifically described herein.

Example embodiments described herein provide applications, tools, data structures and other support to implement a machine learning baby monitor. Other embodiments of the described techniques may be used for other purposes, including transmitting data to various distribution equipment, computers, peripherals, mobile devices, and other electronic devices, etc., for further processing and analysis. In the following description, numerous specific details are set forth, such as data formats, program sequences, processes, and the like, in order to provide a thorough understanding of the described techniques. The embodiments described also can be practiced without some of the specific details described herein, or with other specific details, such as changes with respect to the ordering of the code flow, different code flows, and the like. Thus, the scope of the techniques and/or functions described are not limited by the particular order, selection, or decomposition of steps described with reference to any particular module, component, or routine.

Figure 2:
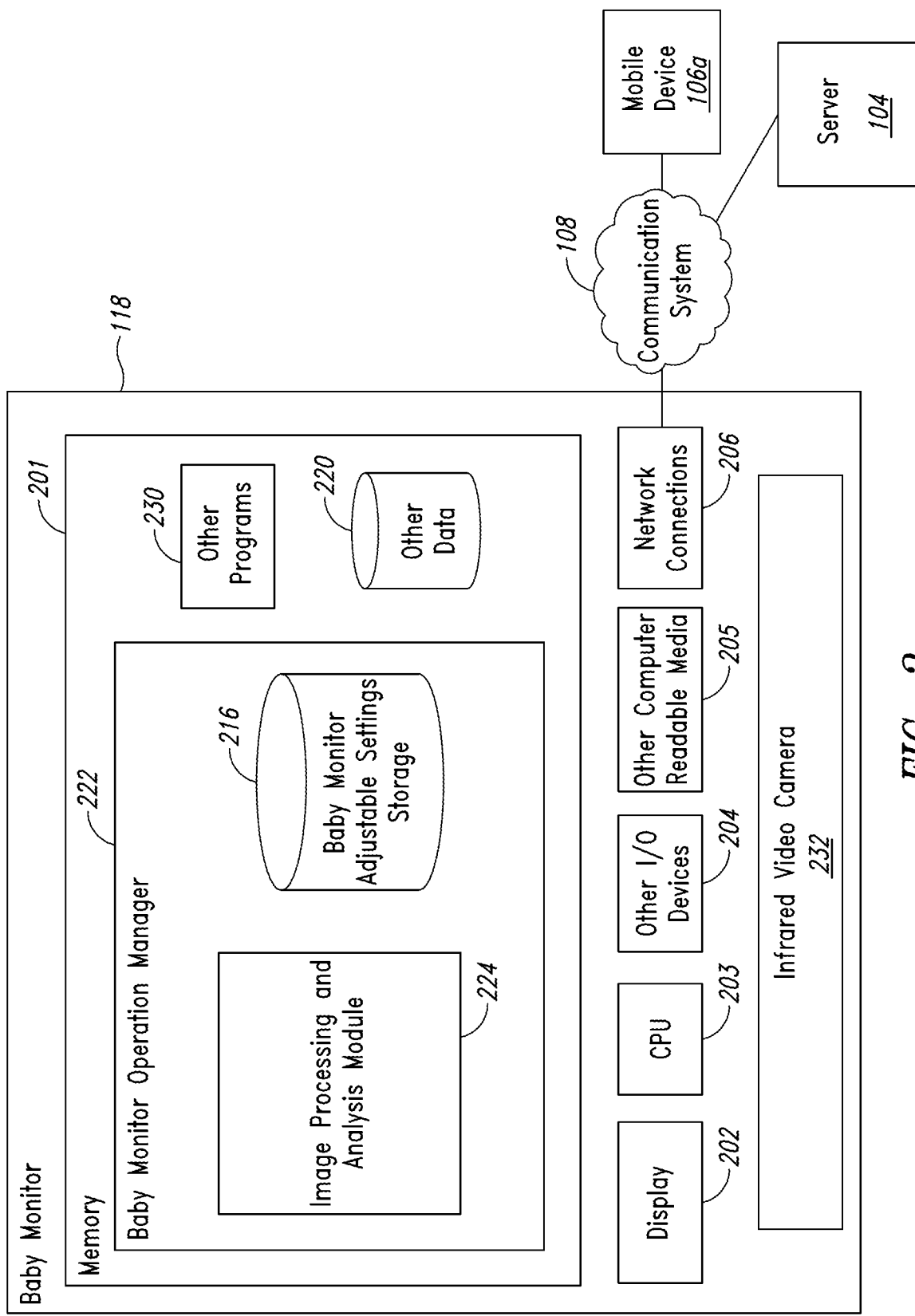
FIG. 2 is a block diagram illustrating elements of an example a machine learning baby monitor, according to one example embodiment.

FIG. 2 is a block diagram illustrating elements of a machine learning baby monitor, according to one example embodiment.

In one embodiment, the baby monitor 118 is a may be any suitable device or electronic equipment that is operable to receive and process images, video and/or audio of the baby and communicate data regarding the images, video and/or audio as described herein. Note that one or more general purpose or special purpose computing systems/devices may be used to operate the baby monitor 118, store information regarding the baby monitor 118, store adjustment settings and communicate with the server 104 and/or mobile device 106a and 106b. In one embodiment, the computing system may be a local system-on-a-chip (SoC) system, such as, for example, Raspberry Pi. However, other processors and computing platforms may be used. In addition, the baby monitor 118 may comprise one or more distinct computing systems/devices and may span distributed locations. Furthermore, each block shown may represent one or more such blocks as appropriate to a specific embodiment or may be combined with other blocks. Also, the baby monitor operation manager 222 may be implemented in software, hardware, firmware, or in some combination to achieve the capabilities described herein.

In the embodiment shown, baby monitor 118 comprises a computer memory ("memory") 201, a display 202 (including, but not limited to a light emitting diode (LED) panel, liquid crystal display (LCD), touch screen display, etc.), one or more Central Processing Units ("CPU") 203, Input/Output devices 204 (e.g., button panel, keyboard, mouse, RF or infrared receiver, universal serial bus (USB) ports, other communication ports, and the like), other computer-readable media 205, and network connections 206. The baby monitor operation manager 222 is shown residing in memory 201. In other embodiments, some portion of the contents and some, or all, of the components of the baby monitor operation manager 222 may be stored on and/or transmitted over the other computer-readable media 205. The components of the baby monitor 118 and baby monitor operation manager 222 preferably execute on one or more CPUs 203 and facilitate the detection of different states and positions the baby is in based on analyses of images of the baby using machine learning techniques and communicate information regarding such detection, as described herein. In other embodiments, other processing devices and configurations may be used, including, but not limited to, graphics processing units (GPU), ASICs and embedded CPU/GPU blocks, Neural Processing Units (NPU), Intelligence Processing Units (IPU), and Deep Learning Accelerators (DLA). Such processors often have functionality that accelerates the execution of matrix math for convolutional neural networks enabling the systems and methods for a machine learning baby monitor described herein to classify and/or train faster. The baby monitor operation manager 222 may operate as, be part of, or work in conjunction and/or cooperation with various software applications stored in memory 201. The baby monitor operation manager 222 also facilitates communication with peripheral devices and the infrared video camera 232, via the I/O devices 204 and with remote systems (e.g., the server 104 and/or the mobile device 106a and/or 106b) via the network connections 206.

Recorded or buffered digital video of the baby received may reside on the other data repository 220, for storing, processing, analyzing, communicating and displaying of the received images from digital video captured by the camera 232. The other data repository 220 may also store various video and image metadata associated with the recorded or buffered video and images in the other data repository 220, such as that including, but not limited to, resolution indicators, format indicators, tags, codes, identifiers, format indicators, timestamps, user identifications, authorization codes, digital signatures, etc.

The image processing and analysis module 224 is configured to analyze the plurality of digital images of the baby during a period of time and detect a plurality of different states the baby is in during the period of time based on the analysis of the plurality of digital images of the baby. This may, for example, include determining which of the plurality of digital images of the baby generated during the period of time corresponds to which of a plurality of different recognized positions of the baby. The image processing and analysis module 224 may be trained to recognize such positions by training, for example, a convolutional multi-layer neural network either resident within the memory 201, other programs 230 and/or on the server 104, to detect the plurality of different positions of the baby. This may be accomplished by training the convolutional multi-layer neural network using a database of images representative of the plurality of different positions of the baby, wherein each image is tagged or associated with a particular baby position. For example, each different position may be designated as representative of a corresponding different one the states: baby awake, baby asleep, baby crying and baby's face is covered.

The image processing and analysis module 224 may also decode, decompress, format, translate, perform digital signal processing, adjust data rate and/or complexity or perform other processing on the data representing received video and/or images of the baby as applicable for presenting the data in real time or near real time on the mobile device 106a and 106b as it is being received by the baby monitor 118.

Other code or programs 230 (e.g., further audio/video processing modules, a program guide manager module, a Web server, and the like), and potentially other data repositories, such as data repository 220 for storing other data (user profiles, preferences and other configuration data, etc.), also reside in the memory 201, and preferably execute on one or more CPUs 203. Of note, one or more of the components in FIG. 2 may or may not be present in any specific implementation. For example, some embodiments may not provide other computer readable media 205 or a display 202.

In some embodiments, the baby monitor 118 and baby monitor operation manager 222 includes an application program interface ("API") that provides programmatic access to one or more functions of the baby monitor 118 and operation manager 222. For example, such an API may provide a programmatic interface to one or more functions of the baby monitor operation manager 222 that may be invoked by one of the other programs 230, the mobile device 106a and/or 106b, the server 104 or some other module. In this manner, the API may facilitate the development of third-party software, such as various different service applications, user interfaces, plug-ins, adapters (e.g., for integrating functions of the baby monitor operation manager 222 into desktop or mobile applications), and the like to facilitate systems and methods for a machine learning baby monitor using the baby monitor 118.

In an example embodiment, components/modules of the baby monitor 118 and the baby monitor operation manager 222 are implemented using standard programming techniques. For example, the baby monitor operation manager 222 may be implemented as a "native" executable running on the CPU 203, along with one or more static or dynamic libraries. In other embodiments, the baby monitor 118 and baby monitor operation manager 222 may be implemented as instructions processed by a virtual machine that executes as one of the other programs 230. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Scratch, Python, JavaScript, VBScript, and the like), or declarative (e.g., SQL, Prolog, and the like).

In a software or firmware implementation, instructions stored in a memory configure, when executed, one or more processors of the baby monitor 118 to perform the functions of the baby monitor operation manager 222. The instructions cause the CPU 203 or some other processor, such as an I/O controller/processor, to perform the processes described herein.

The embodiments described above may also use well-known or other synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multi-threading, client-server, or peer-to-peer (e.g., Bluetooth® wireless technology providing a communication channel between the baby monitor 118 and the mobile device 106b), running on one or more computer systems each having one or more CPUs or other processors. Some embodiments may execute concurrently and asynchronously, and communicate using message passing techniques. Equivalent synchronous embodiments are also supported by a baby monitor operation manager 222 implementation. Also, other functions could be implemented and/or performed by each component/module, and in different orders, and by different components/modules, yet still achieve the functions of the baby monitor 118 and operation manager 222.

In addition, programming interfaces to the data stored as part of the baby monitor 118 and baby monitor operation manager 222, can be available by standard mechanisms such as through C, C++, C#, and Java APIs; libraries for accessing files, databases, or other data repositories; scripting languages; or Web servers, FTP servers, or other types of servers providing access to stored data and machine learning models. The baby monitor adjustable settings setting storage 216 and other data 220 may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, and Web Services (XML-RPC, JAX-RPC, SOAP, and the like). Other variations are possible. Other functionality could also be provided by each component/module, or existing functionality could be distributed amongst the components/modules in different ways, yet still achieve the functions of the baby monitor operation manager 222.

Furthermore, in some embodiments, some or all of the components of the baby monitor 118 and operation manager 222 may be implemented or provided in other manners, such as at least partially in firmware and/or hardware, including, but not limited to one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network, cellular wireless network or other data transmission medium; or a portable media article to be read by an appropriate drive or via an appropriate connection, such as a flash memory device) so as to enable or configure the computer-readable medium and/or one or more associated computing systems or devices to execute or otherwise use, or provide the contents to perform, at least some of the described techniques.

Figure 3:
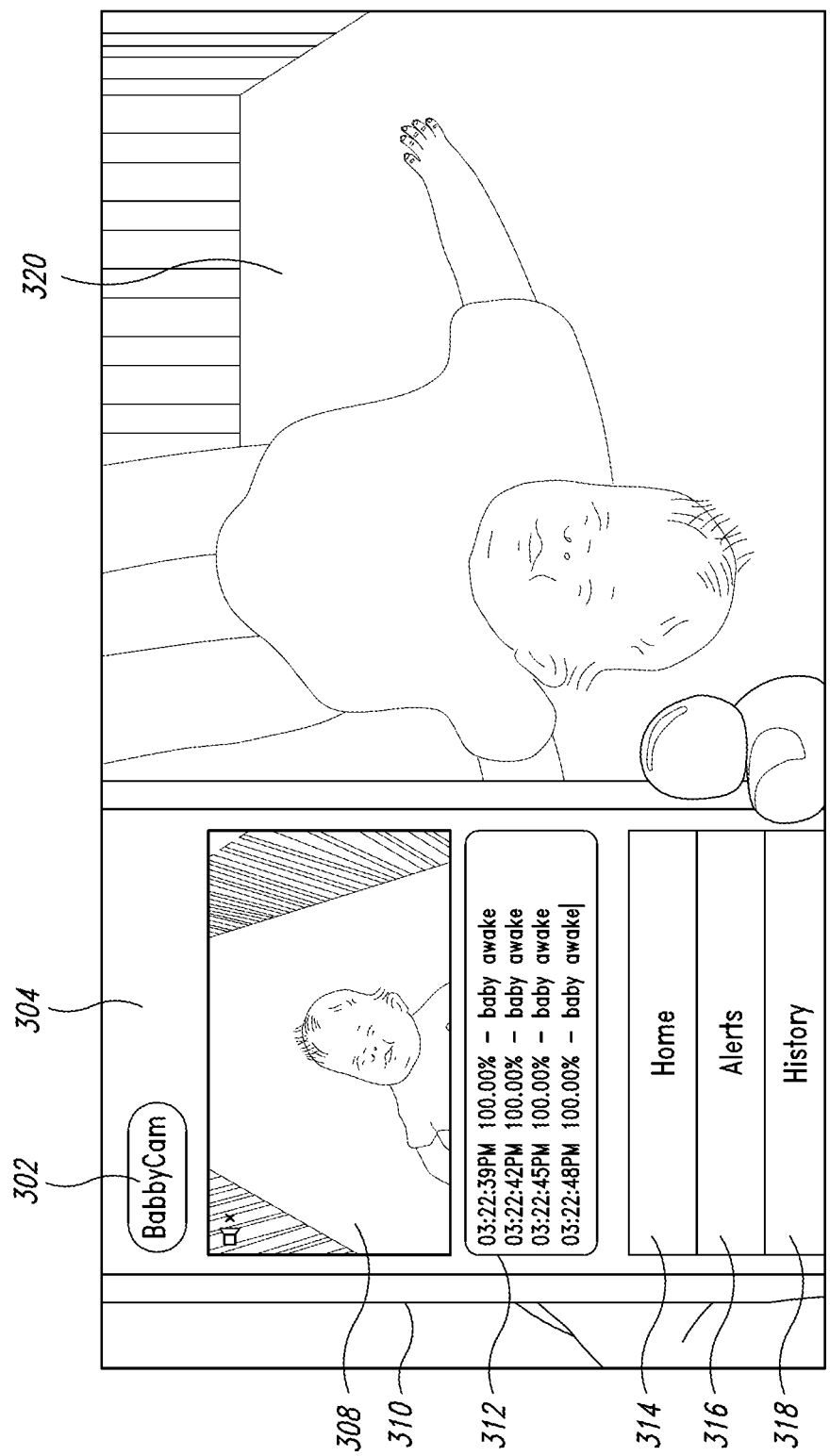
FIG. 3 is a diagram of notifications provided by systems and methods for a machine learning baby monitor displayed on a mobile device of a user, according to one example embodiment.

FIG. 3 is a diagram of notifications 312 provided by systems and methods for a machine learning baby monitor displayed on a mobile device 310 of a user 310, according to one example embodiment. For example, the mobile device 310 of the user may be the mobile device 106a or 106b shown in FIGS. 1 and 2. Shown is one example screen of the user interface 304 provided by systems and methods for a machine learning baby monitor. Shown is a "Baby monitor 118" button to select to view images or video of the baby in the baby crib 320 on the user's mobile device 310 in real time or near real time that are being captured by the baby monitor 118 shown in FIGS. 1 and 2. Also shown is a "Home" button 314 to switch to a home screen of the user interface 304, an "Alerts" button 316 to switch to an alerts screen of the user interface 304 and a "History" button to switch to a user interface screen such as that of FIG. 9 that displays see historical data recorded by the baby monitor 118.

According to one example embodiment, the system described herein classifies images into 5 categories: baby awake, baby asleep, baby crying, baby's face is covered, and no baby. "Face covered" means baby monitor 118 sees a baby's head but cannot clearly see the nose or mouth. The classifications may occur every 3-4 seconds and may be according to the capabilities of the hardware of the baby monitor 118, and displayed as part of the notifications 312. The system enables the rate of classifications to be adjusted with stronger or weaker hardware. According to one embodiment, while the video stream is running, an image 308 is generated from the video stream and classified with the CNN and is displayed on a user interface screen, such as on a user's mobile device. The classifications are displayed to the user along with timestamps and confidence percentages as part of the notifications 312. This allows the user to see the baby monitor 118 is actively monitoring their baby. The classification display can be toggled on and off by the user.

A sixth classification category also exists but, in some embodiments, is not displayed to the user. This category is when the baby makes a sound, which combines the image classifier with a sound threshold. For example, if the baby monitor 118 detects a baby present (any classification but "no baby") and detects sound that is loud enough to breach an adjustable loudness threshold, it may then send an alert to the user's mobile device. For infants, stomach sleeping is generally not recommended so one of the baby monitor's classifications, "face is covered", is typically useful for parents. However, as babies get older, they can start safely sleeping on their stomachs and so there is a preference feature for converting a baby's face covered classification to baby asleep.

An "unknown" state is also included in some embodiments. Instead of showing classifications with low confidence, the system would show the "unknown" state instead. The threshold for the level of confidence below which the "unknown" state is shown may be selectable by the user. This would show more clearly that the baby monitor 118 needs more training and doesn't recognize anything that it sees. Alternatively, the baby monitor 118 would simply not show any classifications at all when the confidence level is below the particular threshold. This feature reduces the noise of inaccurate classifications, which some users may prefer.

Figure 4:
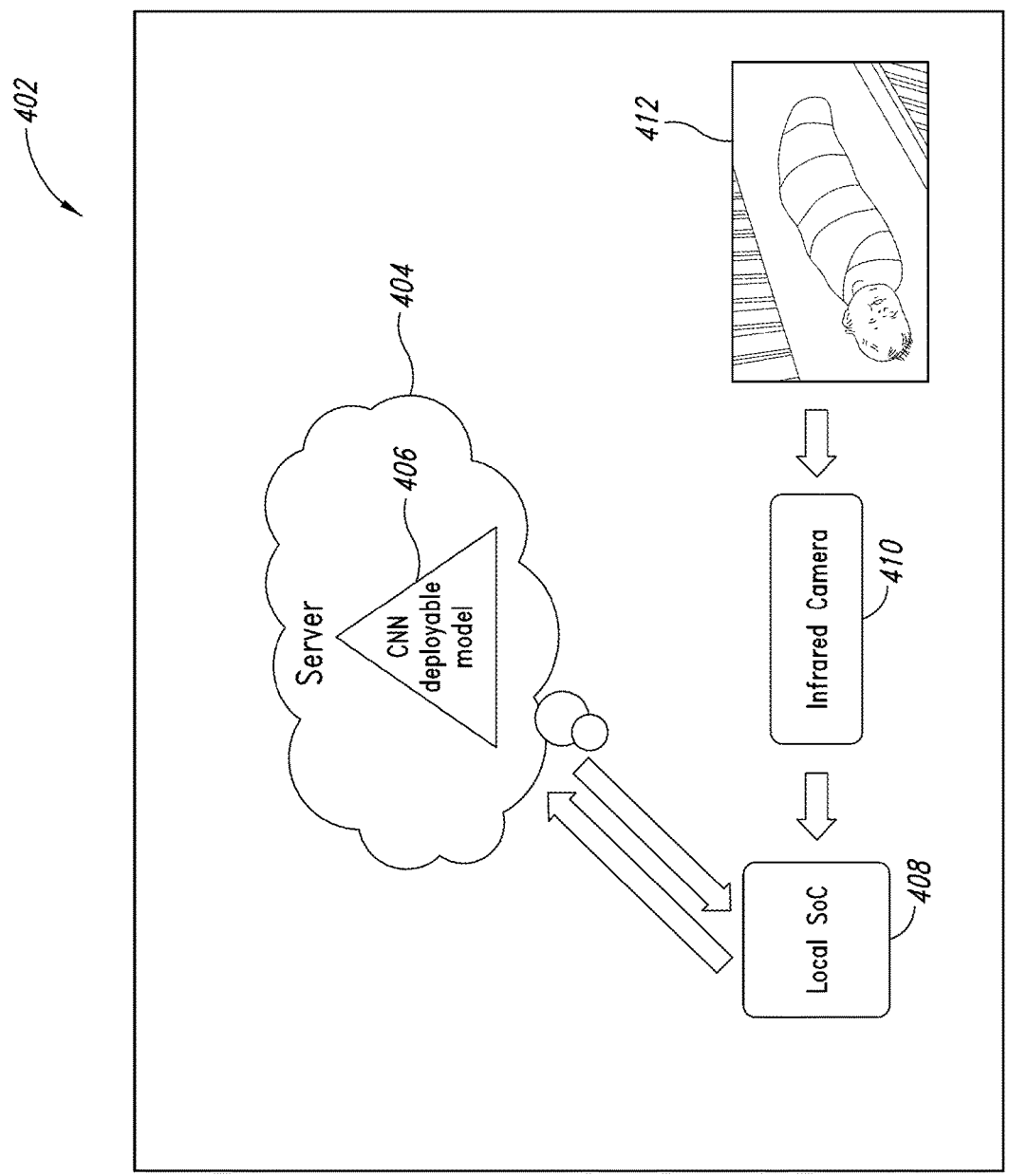
FIG. 4 is a diagram of a system architecture of systems and methods for a machine learning baby monitor, according to one example embodiment.

FIG. 4 is a diagram of a system architecture 402 of systems and methods for a machine learning baby monitor, according to one example embodiment. For example, the server 404 may correspond to the server 104 in FIGS. 1 and 2, the local system on chip (Soc) may comprise the CPU 203 and memory 201 of FIG. 2 and the infrared camera may be the infrared camera 232 of FIG. 2. Deep learning is a form of machine learning that can recognize patterns in a data set. It uses a convolutional multi-layer neural network (CNN) to achieve the learning. CNNs are able to learn filters that can identify edges and structures. These are used as building blocks to eventually detect higher-level objects such as babies and faces.

Training systems and methods for a machine learning baby monitor involves taking a neural network trained on a database of images, such as, for example, ImageNet, then locking the top layers, removing the last connected layer, creating a new last layer with the desired number of categories, and adjusting the hyperparameters. Many neural networks are publicly available online. A list of them for the Caffe framework is at https://github.com/BVLC/caffe/wiki/Model-Zoo. One can download them from github directly. In one example, SqueezeNet may be used, which is made to run on mobile devices and does not require a large amount of power, but gives up some accuracy. However, different neural networks are available and contemplated for performing the functionality described herein.

A neural network for images typically includes of convolutional layers connected to each other. Locking the top layers means those layers are not allowed to learn or change their weights. ImageNet is a large image database (~15 million labeled images) on which researchers train their neural networks and compete with. Because the database is so large and training takes a large amount of GPU horsepower mostly available to big institutions and universities, one who wants to use their neural network will not train the network from scratch. It is found that after training these large diverse data sets, the top layers do not change a large amount. This is because the top layers are those that start recognizing basic shapes and lines in pictures, which is useful for many different image recognition tasks. Locking the top layers does not allow the weights to change on the top layers, but allows the bottom layer to learn and change weights. Since the bottom layer can learn and change its weights, it can be made specific to one's image recognition task. So instead of recognizing babies, if one wants to recognize dogs, one would allow the last layer of the neural network to learn and after training on dog images, and the system would start recognizing dogs.

Adjusting hyperparameters refers to higher level "knobs" that can be changed and adjusted for training. One common hyperparameter is the learning rate. By making the learning rate large, the neural network can learn quickly. By making the learning rate small, the neural network will learn slower and can get stuck in a certain plateau. An example will be provided to explain this. When the system starts training, a larger learning rate can be set. The accuracy can jump from 0% to 60%, then down to 30%, then up to 70%. It can vary widely. However, one can take the model that hit 70% and set a smaller learning rate. Then the neural network can creep up from 70% to 75%, to 78% accuracy, etc.

Different frameworks for neural networks involve different amounts of coding. Some frameworks allow one to describe the network in python, so one can connect the convolutional layers together with python. Caffe uses protobuf, which is what may be used to adjust the layers and change learning rates. It is basically a structured way of describing a network. There currently exist many machine learning tools which are referred to as "frameworks". They are middleware which make it easier to build a neural network and train. Tensorflow is one example, but Caffe may be preferable in some embodiments because it handles images well. Other image databases could be used instead of ImageNet. When AlexNet (one of the first neural networks) came out, it created a large leap for image recognition. Previously, ImageNet was the standard that researchers used to test their algorithms.

In some embodiments, the data set used for training is a large number of images grouped into the individual categories of "baby asleep", "baby awake", "baby crying", "baby's face covered", and "no baby". In addition to the training data set, a separate group of images with the same categories is kept called the validation set. This data set is not used during training but for testing the quality of the trained model. In some embodiments, data augmentation is applied to the data set such has random crop (rotation & shifting), resolution scaling, grayscale conversion, color distortion, vertical and horizontal flip, shearing, and stretching. The validation set is used at every "epoch" of training. One epoch is a complete pass through all the training data. Training involves many epochs as the computer passes through the data set, adjusting weights to make the classifier more accurate. After one epoch, the validation data set is used and the system can get an accuracy percentage from it. This is important because the system can train so much that the neural network starts memorizing pixels and irrelevant information from the data set, called overfitting. But then because the system just started memorizing color or pixels, it will underperform on data the system has not seen before, the validation set. So to prevent the neural network from overfitting, the system uses a validation set as a threshold of when to stop training.

For example, in one embodiment, there is a separate folder of images that the neural network has not seen before. The neural network tool is pointed to that folder and the neural network tool will initialize the training process. For training, one embodiment uses Nvidia Digits because it has a graphical user interface that can adjust learning rates and training sets.

Validation sets are used when training, the validation sets are not used directly on the Baby monitor 118 devices. In one embodiment, machine learning model that receives the highest validation accuracy is sent to the local Soc 408 of the Baby monitor periodically, such as every night. The data is trained on one or more remote servers 404 due to alleviate large hardware requirements. For example, such processing may be hosted by Amazon Web Services (AWS). In other embodiments, this training may be done locally on the local SoC 408. New data can be uploaded for training every day and a new model is sent to the local SoC 408 of one or more baby monitors after meeting accuracy requirements. In this way, the baby monitor can fix mistakes in its accuracy and increase confidence on correct classifications. For example, the new data may be the customer's baby images. Since the baby monitor 118 initially has never seen the baby and the environment the baby is in 412 (room, blankets, cribs), it can have low accuracy. As more images of the baby and the surroundings 412 are uploaded for training, accuracy increases. The local SoC 408 will cause the baby monitor 118 to automatically upload these images, at the discretion of the customer. In some embodiments, by default, the automatic upload feature is off and the customer has to manually enable it. In some embodiments, the baby monitor 118 will save an image from video every 3 seconds. The baby monitor 118 may detect whether the image is nearly identical to the previous, and then determine to not save it. However, in some embodiments, if the classification changes from the previous image, "no-baby" to "baby-asleep", the baby monitor 118 will save the image. This is done to produce a diverse image set that can be uploaded and trained.

The more processing capability the local SoC 408 has, the more frequently model updates can be done for that local SoC 408. Note that in some embodiments, the classifications (also known as "inference" in deep learning") occur on the baby monitor 118 and not the remote server 404. This removes the cost of running classification servers and addresses privacy concerns of parents. Because the remote servers 404 may have hardware with higher processing power than the deployed baby monitor 118 device, training flows may involve the baby monitor 118 uploading a new data set, training the data set on a bigger, high-accuracy convolutional neural network that automatically categorizes the data, and then training a smaller neural network on the newly categorized data that can be sent to the deployed baby monitor 118 device from the server 404. The new data set may be used to train a larger convolutional neural network. But the point of the large, high-accuracy convolutional neural network is to automatically categorize the new data set and fix the mistakes of the small neural network. The categorized data set is then used to train the small neural network, and a new version is then deployed.

Although in some embodiments, the baby monitor 118 implements an algorithm to remove duplicate images, the baby monitor 118 may save transitions for training because it adds more diversity to the data set. For example, when a classification changes from "baby asleep" to "baby awake", baby monitor 118 will save both images for training. Movement detection can be implemented by watching transition changes in classifications which is common when a baby is awake and moving. Detecting if the image is a duplicate of the previous image is a straightforward way of detecting movement.

Although in one embodiment the data set only includes images, in other embodiments, models can also be trained on video and sound. Detecting the difference between a laugh, cry, and cough is valuable to a parent. Baby monitor 118 may keep a record of how many times a baby coughed to alert parents that their baby may be sick. This is achieved by the baby monitor 118 recording the common sleep pattern of the baby and counting how many times the baby made a sound while sleeping or if the baby woke up often. This would signify a deviation from the normal sleep pattern and baby monitor 118 then alerts a parent or user that the baby did not sleep well or may be sick.

Baby monitor 118 may be used an educational tool for the parent. By including classifications for loose blankets and choke hazards, baby monitor 118 alerts parents if their baby is near dangerous items in their crib. Common baby items such as pacifiers are also trained so baby monitor 118 does not alert parent that it is a dangerous item. This is implemented with multiple neural networks running classification.

CNNs exist that can classify a human's age. In some embodiments, baby monitor 118 uses these models to estimate the age of the baby, and send reasonable alerts about whether it is safe for the baby to sleep on their stomach or have loose blankets covering their face. In addition, baby monitor 118 may use the age information for targeted ads or remind parents about upcoming life stages.

Because the training data of baby monitor 118 in some embodiments is strictly babies, the CNN may be overfit to recognize humans as babies as well. In some embodiments, baby monitor 118 is configured to monitor adults sleeping patterns or the elderly to alert family if they get out of bed and need special care. Baby monitor 118 may be trained to distinguish adults from babies for higher accuracy if desired.

More emotions can be classified such as happiness, sadness, fear, and surprise. Alerts may be sent if the user wants to monitor these emotions. In some embodiments, baby monitor 118 also saves special pictures of the baby that the parent would appreciate such as when the baby is smiling. A higher image resolution may be saved by the baby monitor 118 in these cases as well. Some embodiments include a "memories" feature. In particular, the baby monitor 118 saves an image of the baby from several months ago, a year ago, or some other prolonged period of time, which may be selectable by the user. This is implemented by using neural networks and other image algorithms to pick an appealing image to save from deletion. For example, the algorithm may be to pick a colored image of the baby awake and smiling. Processing implementing such functionality may be performed on the server 104 or baby monitor 118. Then the baby monitor 118 will send the image through email, text, or app to the user, such as to mobile device 106a or 106b a year later as a memory of the user's baby.

Common baby situations such as spit-up and baby standing may also be alerted to the parent by the baby monitor 118. A crib classification allows baby monitor 118 to recognize when a baby is inside or climbing outside a crib.

In some embodiments, a thermometer is added to the system and used in conjunction with classifications of a baby. Baby monitor 118 then alerts parents if temperature is too high or too low only if Baby monitor 118 sees a baby. Baby monitor 118 may also outline the baby on the video with a green box to give clearer classification feedback to the user.

If baby monitor 118 sends an alert to the user and the user deems the classification as wrong, user may send back a text or email to the baby monitor 118 telling it the classification is wrong. Baby monitor 118 then separates the wrong classifications for further training or use as special training emphasis. In some embodiments, the user could also marks the wrong classifications as it is occurring on the baby monitor 118 screen or on the screen of the user's mobile device 310 as another feedback channel.

A training icon or message may appear to the user to show when the Baby monitor 118 device is training. This serves as extra display information for the user who worries that their baby's data is not being trained on.

Babies typically move around a lot in a crib, even while sleeping. Using the results of classifications, the baby monitor 118 may automatically pan the camera 410 around the crib to get a better view of the baby. This may be achieved by moving the camera 410 in a grid-like fashion and monitoring the confidence rates of classifications. A daily activity report may be sent by the baby monitor 118 to the parent outlining when their baby went to sleep, when they woke up, how many hours their baby has slept, etc. This may also be applied to just the night-time activity and parents would receive the report in the morning.

Figures 5A, 5B, 5C:
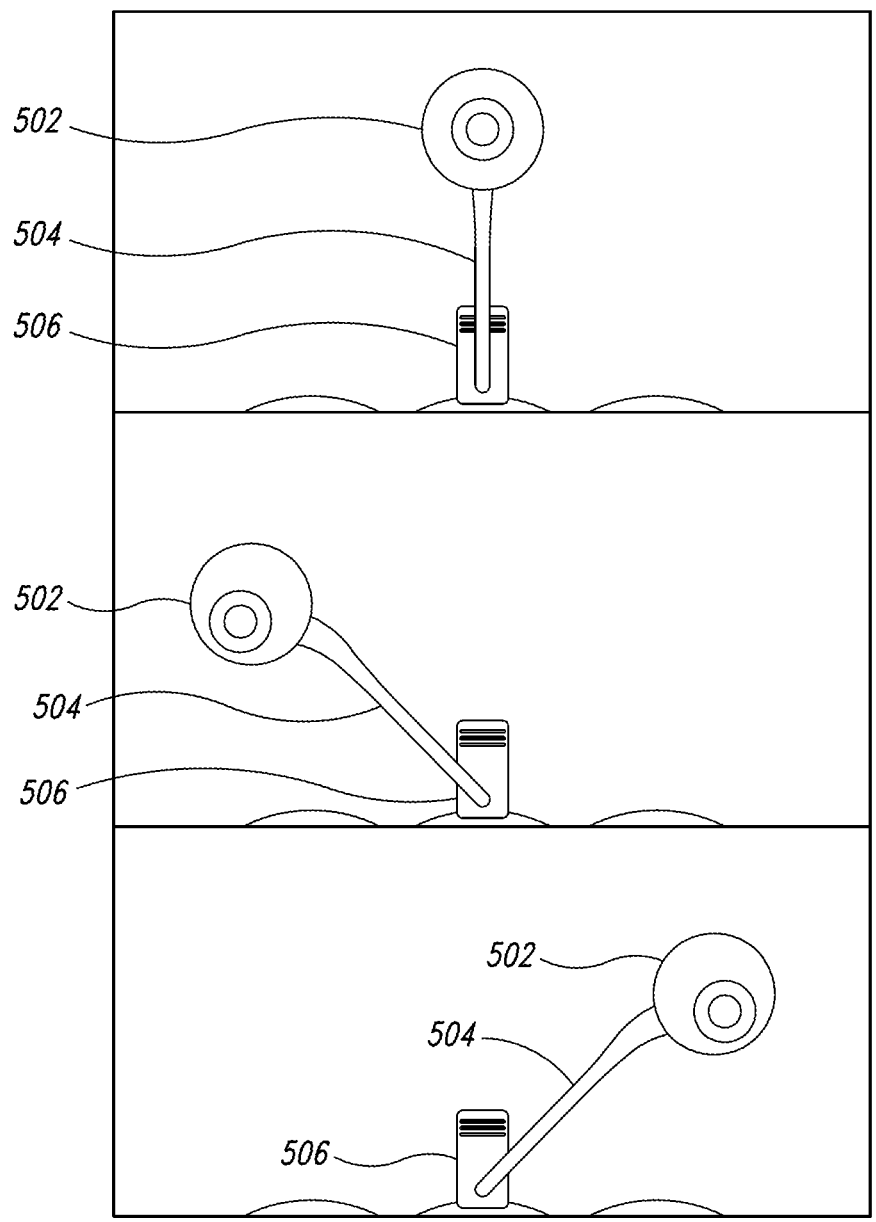
FIGS. 5A through 5C are front elevational view of an adjustable machine learning baby monitor, showing the video camera of the baby monitor in three different respective positions, according to one example embodiment.

FIGS. 5A through 5C are front elevational view of an adjustable machine learning baby monitor 118, showing the video camera 502 of the baby monitor 118 in three different respective positions, according to one example embodiment. In some embodiments, baby monitor 118 comes equipped with an HD night vision camera 502 and a flexible gooseneck 504 attached to a clamp 506. For example, the night vision camera 502 may be the camera 232 of FIG. 2. Night vision is important on baby monitors because most of the time, babies are monitored while they are sleeping in a dark room or at night. The camera 502 uses an infrared (IR) cut filter for day time use and is removed in night mode which allows the camera to see longer wavelengths than visible light. The infrared (IR) light emitting diodes (LEDs) on the camera 502 turn on in night mode and allow the camera 502 to see in the dark with the IR light. The gooseneck hardware 504 is unique because it allows the parent to customize the position and angle of the camera 502.

Figure 6:
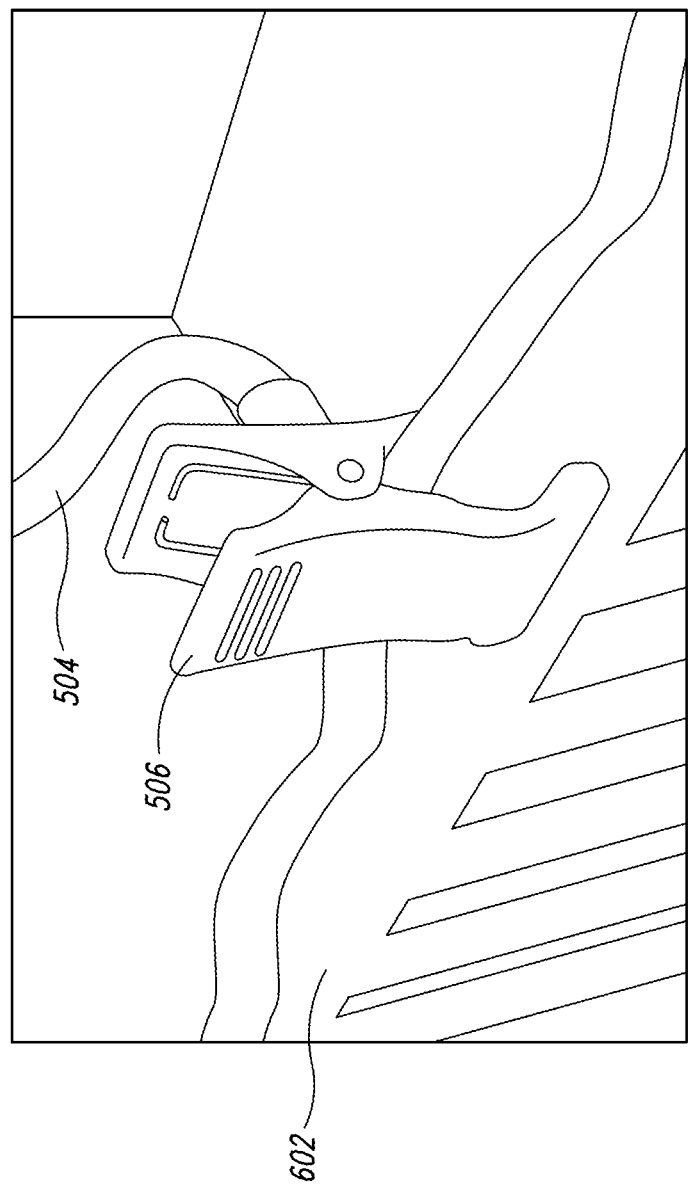
FIG. 6 is a top perspective view of a clamp of a machine learning baby monitor clamped on a baby crib, according to one example embodiment.

FIG. 6 is a top perspective view of a clamp of a machine learning baby monitor clamped on a baby crib 602, according to one example embodiment. The clamp 506 is a convenient feature because it allows the parent to clamp the camera on the crib 602 without any screws or nails. This differentiates the baby monitor 118 from other baby monitors because the majority of IP cameras and baby monitors require mounting with screws. Most babies sleep in cribs so the crib 602 provides an ideal clamping point for the baby monitor. This bypasses the inconvenience of drilling holes in the walls or crib to mount a baby monitor. Furthermore, the clamp feature 506 makes the baby monitor 118 more mobile. Often times, a baby simply refuses to sleep in the crib 602. So the baby may be moved to a playpen or even a car seat. The parent can then move baby monitor 118 and clamp the camera 502 in a closer, convenient location. The combination of the gooseneck 504 and clamp 506 is not found on any baby monitors currently in the market.

In some embodiments, the client software of baby monitor 118, which may run as an application on the mobile device 106a and/or 106b shown in FIGS. 1 and 2 is written in HTML and Javascript which means it can be viewed on common web browsers such as Chrome, Firefox, and Safari. This also means it works cross-platform on different operating systems including iOS, Android, Mac, and Windows. This is an advantage over other baby monitors that may have their own application and can only work on iOS mobile devices or Android, leaving out laptops and desktop PC support. The IP camera may send a video stream straight to the client device, such as mobile device 106b shown in FIG. 1 on the home network on customer premises 116 shown in FIG. 1. This is notable improvement because many IP cameras on the market send the video stream to an external server outside the home network, and then the client device views the stream on that server. To access the baby monitor 118 video stream outside the home network, the parent can enable port forwarding on the router or enable the UPNP auto-configuration feature on baby monitor 118 to open up the port on their router. The auto configuration tool maps the internal IP address of the baby monitor 118 to an external port (usually port 80 unless it is taken). The baby monitor 118 may save its own internal IP address so if it changes, the baby monitor 118 will delete the mapping on the router and create a new port mapping to the new internal IP address. All this is done at the discretion of and is configurable by the user and provides privacy to their video stream. Many IP baby monitors on the market do not give that choice to the parent.

The client application running on the mobile device 106*a* and/or 106*b* implements a video quality checker that monitors the video for freeze ups or truncated images. If these dire conditions are detected, the client application will refresh the stream automatically. A timeout load checker is also implemented to re-connect the stream if it takes too long to load. Client software may also have a dark versus light theme, for easier viewing of the video at night.

Most HD cameras have a larger number of width pixels than the height pixels, i.e., 1920 width×1080 height. Baby monitor 118 may have this common aspect ratio of 16:9 as well. However, if baby monitor 118 is clipped at the end of the crib, fitting the crib within this aspect ratio may not be ideal. Rotating the camera 90 degrees allows the user to take advantage of the longer width and fit the crib easier. However, then the user would have to turn their head 90 degrees to get a straightforward view of the crib. Therefore, the client application running on the mobile device 106*a* and/or 106*b* implements a feature called 'crib view' to rotate the video 90 degrees on client application to solve this problem.

Figure 7:
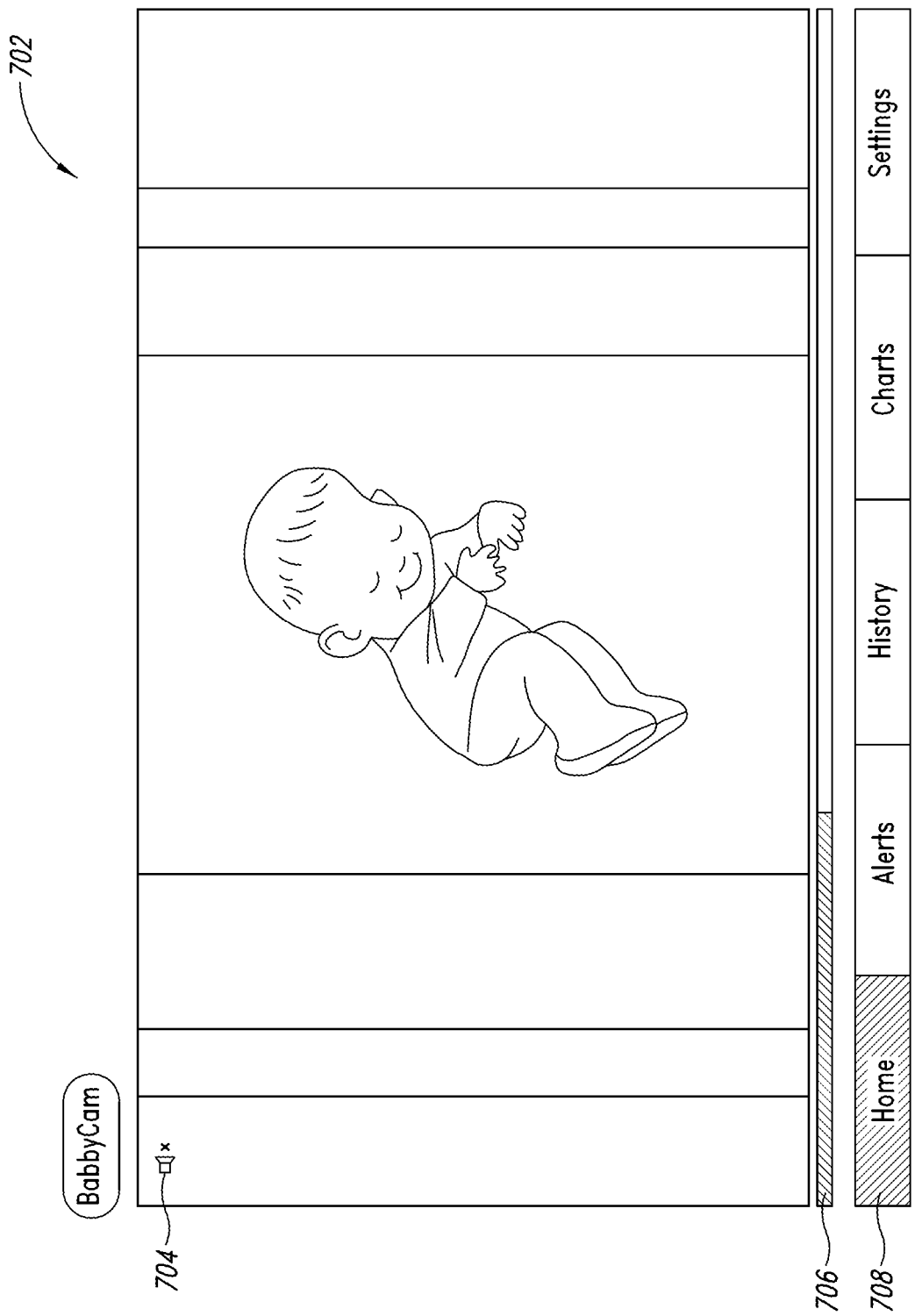
FIG. 7 is a diagram of a graphical user interface provided by systems and methods for a machine learning baby monitor showing a sound meter combined with a video feed of the baby, according to one example embodiment.

FIG. 7 is a diagram of a graphical user interface screen 702 provided by systems and methods for a machine learning baby monitor showing a sound meter combined with a video feed of the baby, according to one example embodiment. The graphical user interface generated by systems and methods for a machine learning baby monitor may provide a graphical user interface screen 702 that displays a sound meter 706 that measures how loud the baby is. The sound meter may change color, for example, from green, to yellow, to red, depending how strong the sound is. This allows a parent to watch their baby silently while still monitoring their baby's cries. Sometimes the baby's face is not visible in the video so it is difficult to tell if the baby is crying or not. The visible sound meter 706 will show the parent that the baby is making noise without actually hearing it themselves. Also shown in a mute button 704 to mute a microphone or speaker and a selectable menu 708 to navigate to other user interface screens. Additional hardware such as a speaker may be present in the baby monitor 118 in various embodiments for two-way communication and playing white noise when a baby is present to aid in sleeping.

Figure 8:
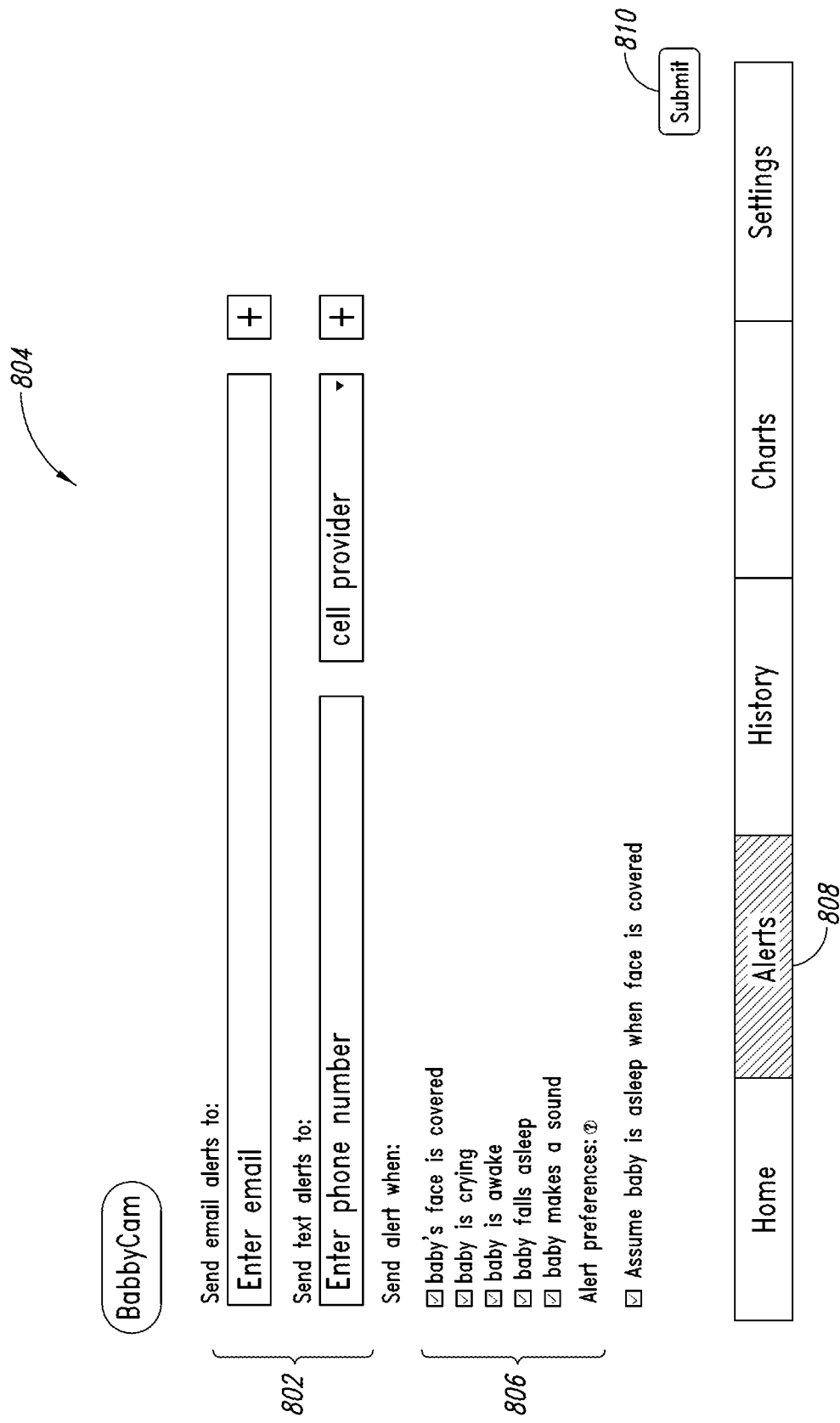
FIG. 8 is a diagram of a graphical user interface provided by systems and methods for a machine learning baby monitor for configuration of sending text or email alerts to the user based on states that the system may detect the baby is in, according to one example embodiment.

FIG. 8 is a diagram of a graphical user interface screen 804 provided by systems and methods for a machine learning baby monitor for configuration of sending text or email alerts to the user based on states that the system may detect the baby is in, according to one example embodiment. The baby monitor 118 may send text or email alerts to the user based on the classification categories. A user can enter in their phone number or email address in fields 802, and then receive alerts on the following selectable situations depicted in the screen 804 as selectable alert preferences 806: baby's face is covered, baby is crying, baby is awake, baby falls asleep, and baby makes a sound. There may be a time limit per alert so once an alert is sent, another will not be sent until a selectable amount of time, for example 15 minutes later. This can be adjusted. The user may then press a submit button 810 to save the preferences. The sleeping alert may be activated when the baby transitions from a non-sleep state to a sleep state. Since the baby will spend the majority of time sleeping in the crib, in some embodiments, the baby monitor 118 may be set by the user to not keep sending sleep alerts throughout the night. There is also shown a selectable menu 808 to navigate to other user interface screens.

In some embodiments, alerts are confidence based. This means if the system classifies a baby awake with low confidence, there is the system decides whether or not to send that alert out. Depending on the frequency of classifications and confidence percentages, the baby monitor 118 may not send an alert if confidence levels are too low (i.e., below a selectable threshold). This cuts down on false positives drastically and does not bombard the user with inaccurate alerts. Alerts may be in various forms, including, but not limited to, text, email, phone call or mobile app alert.

Figure 9:
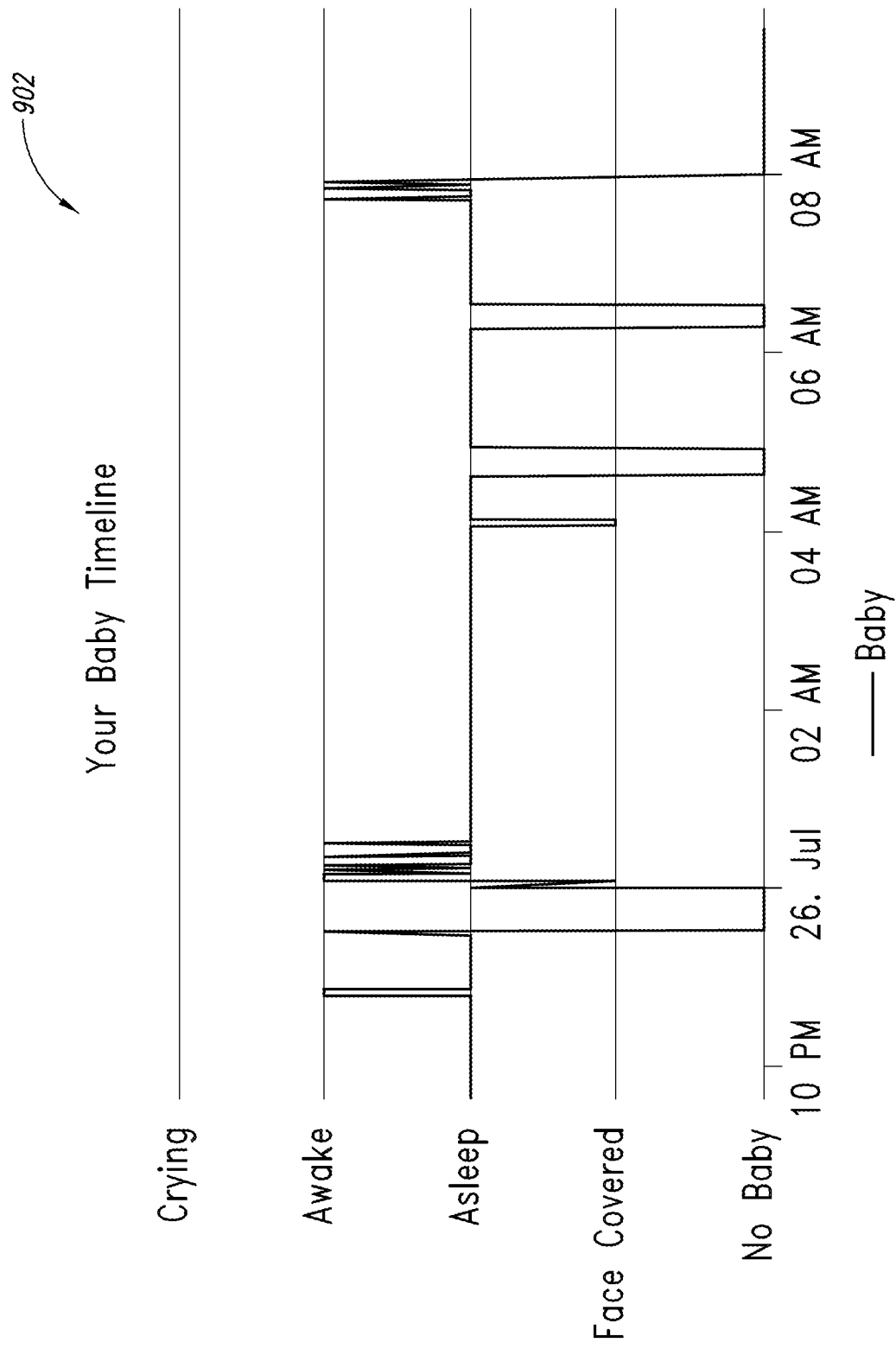
FIG. 9 is an example chart generated by systems and methods for a machine learning baby monitor showing a baby's detected state over time on a line graph.

FIG. 9 is an example chart 902 generated by systems and methods for a machine learning baby monitor showing a baby's detected state over time on a line graph. The baby monitor 118 may record history of the baby. In some embodiments, this may be in 2 forms: charts and time-lapse. The charts feature graphs the baby's classifications over time on a line graph, such as that shown in FIG. 9. For example, the charts can show the classifications over the past 4, 8, 12, and 24 hours. In some embodiments, the time-lapsed history records an image of the baby on every classification. However, if a comparison of the images reveals the previous image is identical to the current image it will not save that image. This makes the history viewer more useful and efficient because it removes redundant images of nothing happening, like in an empty crib. A horizontal scroll bar may be used to quickly scrub through the history of the baby. The user interface may also include a calendar so a user can choose a particular day to review their baby's activities. As disk space is used up, the baby monitor 118 may automatically remove the oldest images to make room for new ones. The baby monitor 118 may take a picture a day of the baby to create an interesting time-lapsed video or gif of the baby growing up over the years. A user may adjust preferences on when the baby monitor 118 takes the picture, for example, only when baby is awake or sleeping. The settings page (not shown) may show the internal and external IP address for the baby monitor 118. This allows the user to connect to one address at home and a different address outside their home, if preferred. In some embodiments, the system automatically connects to these addresses by location. Two example resolutions of video and images generated by the baby monitor 118 are: 1280×720 (HD) and 512×288. This allows the user to adjust for optimal viewing based on their network performance. However, other resolutions may also be used. Users may check an "Enable deep learning to make baby monitor smarter" or similar selectable option on the user interface (not shown) to allow the data including images of their baby to be submitted to training.

Figure 10:
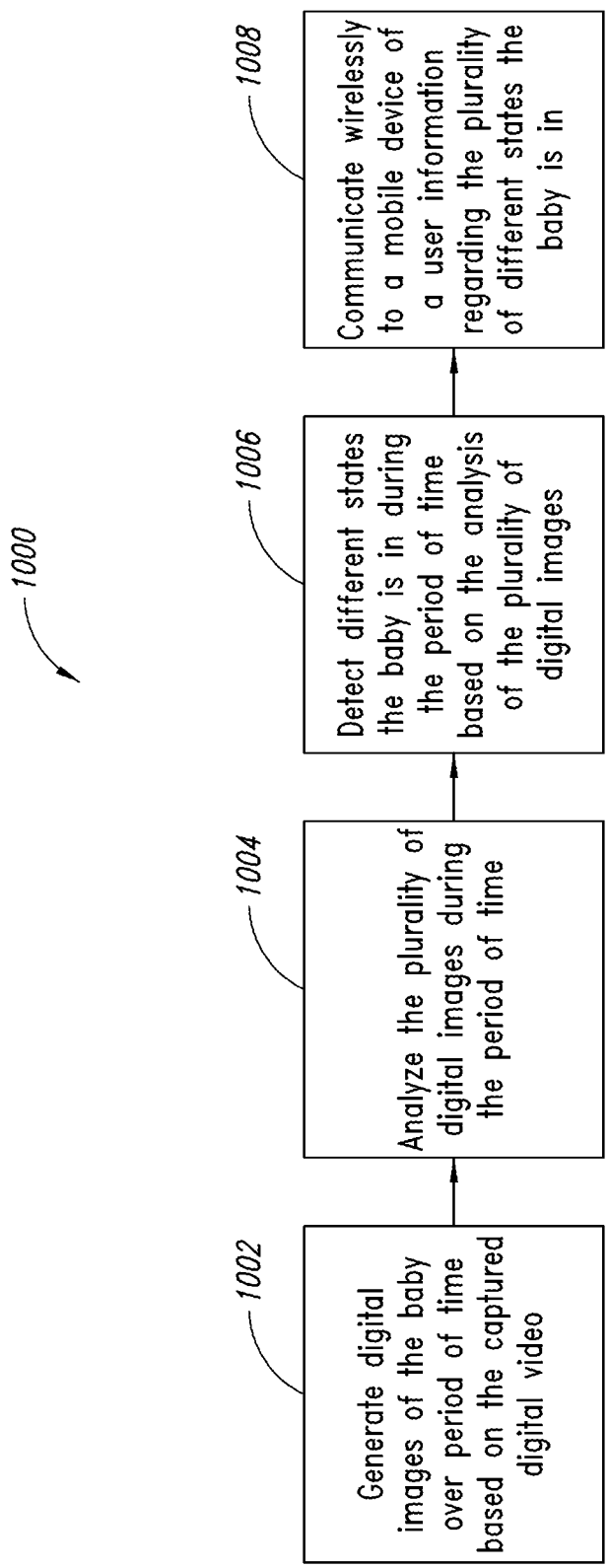
FIG. 10 is a flow diagram of a computerized method of monitoring safety of a baby in systems and methods for a machine learning baby monitor, according to one example embodiment.

FIG. 10 is a flow diagram of a computerized method 1000 of monitoring safety of a baby in systems and methods for a machine learning baby monitor, according to one example embodiment.

At 1002, the system generates a plurality of digital images of the baby over the period of time based on the captured digital video.

At 1004, the system analyzes the plurality of digital images during the period of time.

At 1006, the system detects a plurality of different states the baby is in during the period of time based on the analysis of the plurality of digital images.

At 1008, the system electronically communicates wirelessly to a mobile device of a user, during the period of time, information regarding the plurality of different states the baby is in during the period of time based on the analysis of the plurality of digital images.

Figure 11:
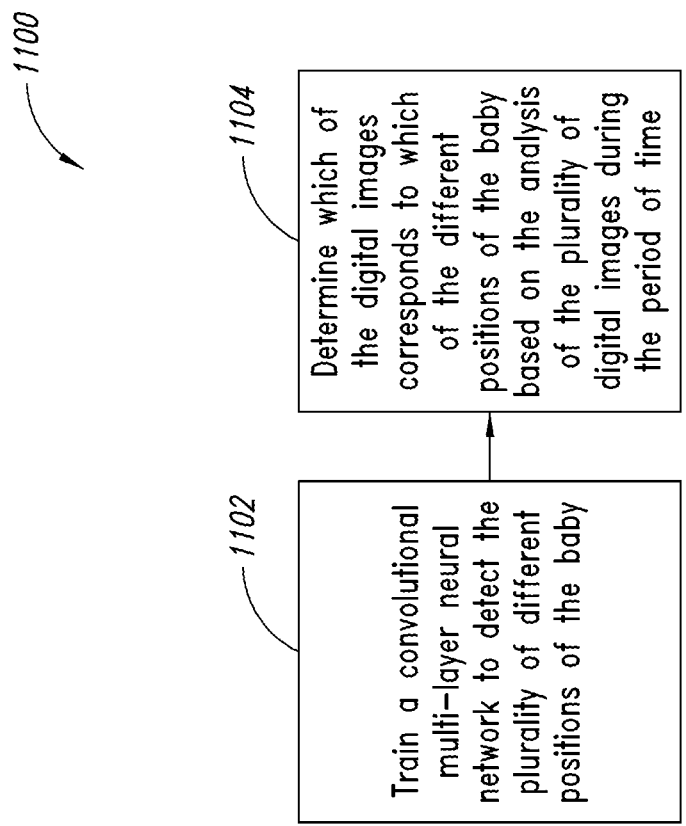
FIG. 11 is a flow diagram of a computerized method of detecting a plurality of different positions a baby is in using machine learning useful in systems and methods for a machine learning baby monitor, according to another example embodiment.

FIG. 11 is a flow diagram of a computerized method 1100 of detecting a plurality of different positions a baby is in using machine learning useful in systems and methods for a machine learning baby monitor, according to another example embodiment.

At 1102, the system trains a convolutional multi-layer neural network to detect the plurality of different positions of the baby by training the convolutional multi-layer neural network using a database of images representative of the plurality of different positions of the baby. Each different position is representative of a corresponding different one the states: baby awake, baby asleep, baby crying and baby's face is covered;

At 1104, the system, based on the analysis of plurality of digital images during the period of time, determines which of the plurality of digital images during the period of time corresponds to which of the plurality of different positions of the baby.

Figure 12:
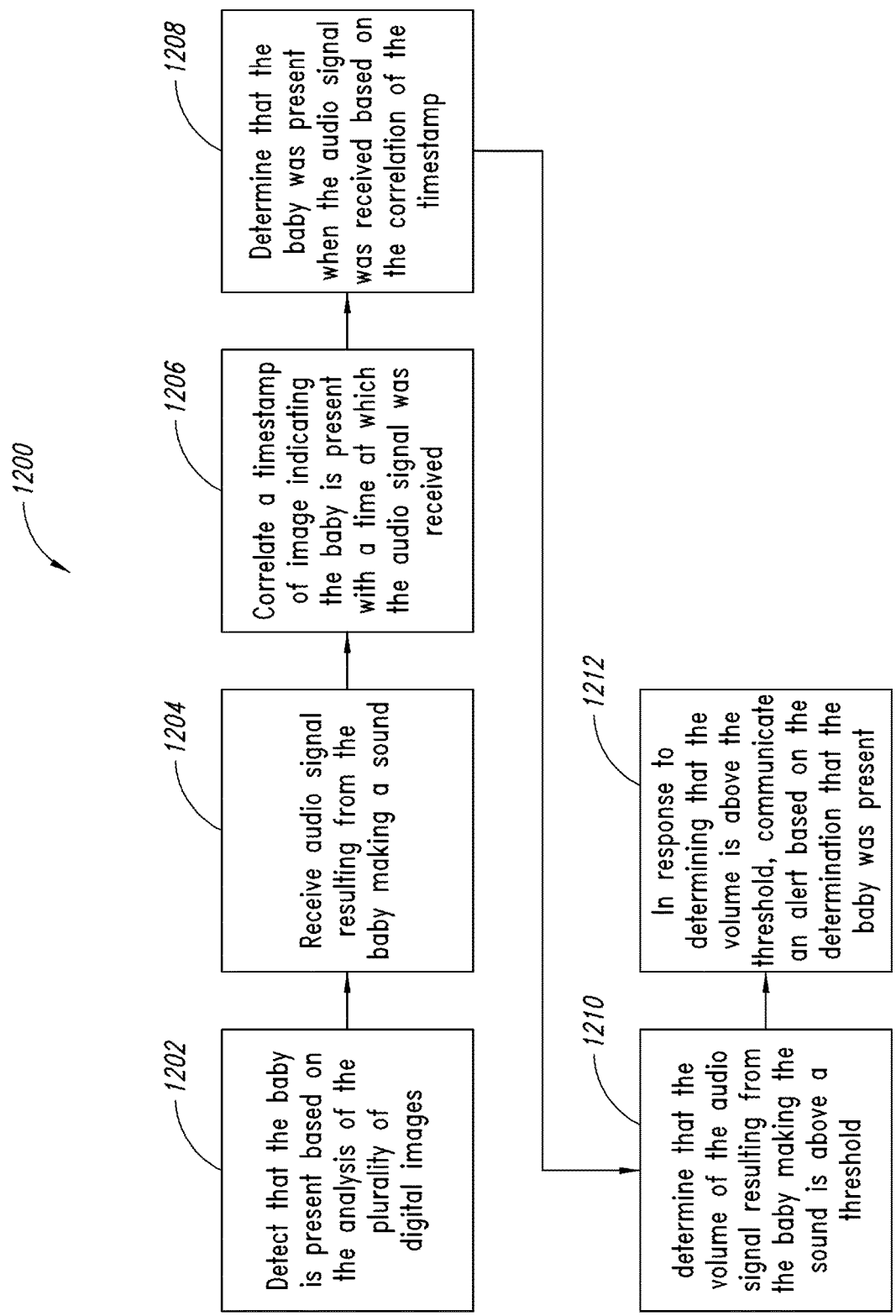
FIG. 12 is a flow diagram of a computerized method of sending an alert based on correlation and analysis of audio and video useful in systems and methods for a machine learning baby monitor, according to another example embodiment.

FIG. 12 is a flow diagram of a computerized method 1200 of sending an alert based on correlation and analysis of audio and video useful in systems and methods for a machine learning baby monitor, according to another example embodiment.

At 1202, the system detects that the baby is present based on the analysis of the plurality of digital images.

At 1204, the system receives audio signal resulting from the baby making a sound.

At 1206, the system correlates a timestamp associated with a digital image of the plurality of digital images indicating the baby is present with a time at which the audio signal was received resulting from the baby making the sound.

At 1208, the system determines that the baby was present when the audio signal resulting from the baby making the sound was received based on the correlation of the timestamp associated with the digital image of the plurality of digital images indicating the baby is present with the time at which the audio signal was received resulting from the baby making the sound.

At 1210, the system determines that the volume of the audio signal resulting from the baby making the sound is above a threshold.

At 1212, the system, in response to a determination that the volume of the audio signal resulting from the baby making the sound is above a threshold, electronically communicates an alert based on the determination that the baby was present when the audio signal resulting from the baby making the sound was received.

While various embodiments have been described herein above, it is to be appreciated that various changes in form and detail may be made without departing from the spirit and scope of the invention(s) presently or hereafter claimed.

The invention claimed is:

1. A computerized method for monitoring safety of a baby, comprising:
capturing, by at least one computer processor, digital video of the baby over a period of time;
generating, by at least one computer processor, a plurality of digital images of the baby over the period of time based on the captured digital video;
analyzing, by at least one computer processor, the plurality of digital images during the period of time;
detecting, by at least one computer processor, a plurality of different states the baby is in during the period of time based on the analysis of the plurality of digital images; and
electronically communicating wirelessly to a mobile device of a user, during the period of time, by at least one computer processor, information regarding the plurality of different states the baby is in during the period of time based on the analysis of the plurality of digital images;
detecting, by at least one computer processor, that the baby is present based on the analysis of the plurality of digital images;
receiving, by at least one processor, audio signal resulting from the baby making a sound;
correlating, by at least one processor, a timestamp associated with a digital image of the plurality of digital images indicating the baby is present with a time at which the audio signal was received resulting from the baby making the sound;
determining, by at least one processor, that the baby was present when the audio signal resulting from the baby making the sound was received based on the correlation of the timestamp associated with the digital image of the plurality of digital images indicating the baby is present with the time at which the audio signal was received resulting from the baby making the sound;
determining, by at least one processor, that the volume of the audio signal resulting from the baby making the sound is above a threshold; and
in response to determining that the volume of the audio signal resulting from the baby making the sound is above a threshold, at least one processor electronically communicating an alert based on the determination that the baby was present when the audio signal resulting from the baby making the sound was received.

2. The method of claim 1 wherein the detecting, by at least one computer processor, the plurality of different states the baby is in during the period of time based on the analysis of the plurality of digital images includes at least one computer processor selecting between the following states based on the analysis of the plurality of digital images: baby awake, baby asleep, baby crying, baby's face is covered and no baby.

3. The method of claim 1 wherein the detecting, by at least one computer processor, the plurality of different states the baby is in during the period of time based on the analysis of the plurality of digital images includes at least one computer processor determining, based on the analysis of the plurality of digital images, that the baby had been in each of the following states over the period of time: awake, asleep, crying and face is covered.

4. The method of claim 1 wherein the detecting, by at least one computer processor, the plurality of different states the baby is in during the period of time based on the analysis of the plurality of digital images includes at least one computer processor selecting at least one of the following states based on the analysis of the plurality of digital images: baby awake, baby asleep, baby crying, baby's face is covered and no baby.

5. The method of claim 4 wherein the selecting at least one of the following states based on the analysis of the plurality of digital images: baby awake, baby asleep, baby crying, baby's face is covered and no baby, includes detecting a plurality of different positions the baby is in during the period of time based on the analysis of the plurality of digital images.

6. The method of claim 5 wherein the detecting a plurality of different positions the baby is in during the period of time based on the analysis of the plurality of digital images includes:

training, by at least one computer processor, a convolutional multi-layer neural network to detect the plurality of different positions of the baby by training the convolutional multi-layer neural network using a database of images representative of the plurality of different positions of the baby, each different position representative of a corresponding different one the states: baby awake, baby asleep, baby crying and baby's face is covered; and based on the analysis of plurality of digital images during the period of time, determining which of the plurality of digital images during the period of time corresponds to which of the plurality of different positions of the baby.

7. The method of claim 1 wherein the electronically communicating wirelessly to a mobile device, during the period of time, information regarding the plurality of different states the baby is in during the period of time based on the analysis of the plurality of digital images includes:

periodically sending status reports to be displayed on the mobile device of the user, each status report indicating a current state the baby is in of the plurality of different states at the time the status report is sent based on the analysis of the plurality of digital images along with a timestamp indicating a time at which the baby was in the current state.

8. The method of claim 7 wherein each of the status reports to be displayed on the mobile device of the user indicating the current state the baby is in includes a percentage of confidence indicating how likely the indication of the current state is accurate.

9. The method of claim 7, further comprising:

receiving, by at least one processor, input from the user to adjust a frequency at which the status reports to be displayed on the mobile device of the user indicating the current state the baby are to be sent; and adjusting, by at least one processor, the frequency at which the status reports to be displayed on the mobile device of the user indicating the current state the baby are to be sent based on the received input from the user to adjust the frequency.

10. The method of claim 1 wherein the electronically communicating wirelessly to a mobile device information regarding the plurality of different states the baby is in during the period of time based on the analysis of the plurality of digital images includes:

sending status reports to be displayed on the mobile device of the user each time and in response to a different state of the baby being detected during the period of time based on the analysis of the plurality of digital images, each status report indicating a current state the baby is in of the plurality of different states at a time the status report is sent.

11. The method of claim 10, further comprising:

causing, by at least one processor, live digital video of the baby to be displayed on the mobile device of the user along with the status reports indicating the current state the baby is in.

12. The method of claim 1, further comprising:

receiving, by at least one processor, input from the user to adjust the threshold;

adjusting the threshold based on the received input from the user to adjust the threshold;

determining, by at least one processor, that the volume of an additional audio signal resulting from the baby making an additional sound is above the adjusted threshold; and in response to determining that the volume of the additional audio signal resulting from the baby making the additional sound is above the adjusted threshold, at least one processor electronically communicating another alert based on a determination that the baby was present when the additional audio signal resulting from the baby making the additional sound was received.

13. A baby monitor, comprising:

at least one memory;

at least one processor coupled to the at least one memory; and at least one video camera coupled to the at least one processor, wherein the at least one memory has computer-executable instructions stored thereon that, when executed, cause the at least one processor to:

cause the video camera to capture digital video of the baby over a period of time;

generate a plurality of digital images of the baby over the period of time based on the captured digital video;

analyze the plurality of digital images during the period of time;

detect a plurality of different states the baby is in during the period of time based on the analysis of the plurality of digital images;

electronically communicate wirelessly to a mobile device of a user, during the period of time, information regarding the plurality of different states the baby is in during the period of time based on the analysis of the plurality of digital images;

detect that the baby is present based on the analysis of the plurality of digital images;

receive an audio signal resulting from the baby making a sound;

correlate a timestamp associated with a digital image of the plurality of digital images indicating the baby is present with a time at which the audio signal was received resulting from the baby making the sound;

determine that the baby was present when the audio signal resulting from the baby making the sound was received based on the correlation of the timestamp associated with the digital image of the plurality of digital images indicating the baby is present with the time at which the audio signal was received resulting from the baby making the sound;

determine that the volume of the audio signal resulting from the baby making the sound is above a threshold; and in response to a determination that the volume of the audio signal resulting from the baby making the sound is above a threshold, electronically communicate an alert based on the determination that the baby was present when the audio signal resulting from the baby making the sound was received.

14. The baby monitor of claim 13 wherein the detecting the plurality of different states the baby is in during the period of time based on the analysis of the plurality of digital images includes selecting at least one of the following states based on the analysis of the plurality of digital images: baby awake, baby asleep, baby crying, baby's face is covered and no baby.

15. The baby monitor of claim 14 wherein the selecting at least one of the following states based on the analysis of the plurality of digital images: baby awake, baby asleep, baby crying, baby's face is covered and no baby, includes detecting a plurality of different positions the baby is in during the period of time based on the analysis of the plurality of digital images.

16. The baby monitor of claim 15 wherein the detecting a plurality of different positions the baby is in during the period of time based on the analysis of the plurality of digital images includes:
    training a convolutional multi-layer neural network to detect the plurality of different positions of the baby by training the convolutional multi-layer neural network using a database of images representative of the plurality of different positions of the baby, each different position representative of a corresponding different one the states: baby awake, baby asleep, baby crying and baby's face is covered; and
    based on the analysis of plurality of digital images during the period of time, determining which of the plurality of digital images during the period of time corresponds to which of the plurality of different positions of the baby.

17. The baby monitor of claim 13 wherein the electronically communicating wirelessly to a mobile device, during the period of time, information regarding the plurality of different states the baby is in during the period of time based on the analysis of the plurality of digital images includes:
    periodically sending status reports to be displayed on the mobile device of the user, each status report indicating a current state the baby is in of the plurality of different states at the time the status report is sent based on the analysis of the plurality of digital images along with a timestamp indicating a time at which the baby was in the current state.

18. The baby monitor of claim 13 wherein the baby monitor, further comprises:
    a flexible gooseneck arm coupled to the video camera at a first end of the flexible gooseneck arm; and
    a clamp coupled to a second end of the flexible gooseneck arm configured to clamp on a baby crib.

19. A non-transitory computer-readable storage medium, having computer executable instructions stored thereon that, when executed by the at least one processor, cause the at least one processor to:
    cause the video camera to capture digital video of the baby over a period of time;
    generate a plurality of digital images of the baby over the period of time based on the captured digital video;
    analyze the plurality of digital images during the period of time;
    detect a plurality of different states the baby is in during the period of time based on the analysis of the plurality of digital images;
    electronically communicate wirelessly to a mobile device of a user, during the period of time, information regarding the plurality of different states the baby is in during the period of time based on the analysis of the plurality of digital images;
    detect that the baby is present based on the analysis of the plurality of digital images;
    receive audio signal resulting from the baby making a sound;
    correlate a timestamp associated with a digital image of the plurality of digital images indicating the baby is present with a time at which the audio signal was received resulting from the baby making the sound;
    determine that the baby was present when the audio signal resulting from the baby making the sound was received based on the correlation of the timestamp associated with the digital image of the plurality of digital images indicating the baby is present with the time at which the audio signal was received resulting from the baby making the sound;
    determine that the volume of the audio signal resulting from the baby making the sound is above a threshold; and
    in response to a determination that the volume of the audio signal resulting from the baby making the sound is above a threshold, electronically communicate an alert based on the determination that the baby was present when the audio signal resulting from the baby making the sound was received.

20. The non-transitory computer-readable storage medium of claim 19 wherein the detecting the plurality of different states the baby is in during the period of time based on the analysis of the plurality of digital images includes selecting at least one of the following states based on the analysis of the plurality of digital images: baby awake, baby asleep, baby crying, baby's face is covered and no baby.

21. The non-transitory computer-readable storage medium of claim 20 wherein the selecting at least one of the following states based on the analysis of the plurality of digital images: baby awake, baby asleep, baby crying, baby's face is covered and no baby, includes detecting a plurality of different positions the baby is in during the period of time based on the analysis of the plurality of digital images.

22. The non-transitory computer-readable storage medium of claim 21 wherein the detecting a plurality of different positions the baby is in during the period of time based on the analysis of the plurality of digital images includes:
    training a convolutional multi-layer neural network to detect the plurality of different positions of the baby by training the convolutional multi-layer neural network using a database of images representative of the plurality of different positions of the baby, each different position representative of a corresponding different one the states: baby awake, baby asleep, baby crying and baby's face is covered; and
    based on the analysis of plurality of digital images during the period of time, determining which of the plurality of digital images during the period of time corresponds to which of the plurality of different positions of the baby.

23. The non-transitory computer-readable storage medium of claim 19 wherein the electronically communicating wirelessly to a mobile device, during the period of time, information regarding the plurality of different states the baby is in during the period of time based on the analysis of the plurality of digital images includes:
    periodically sending status reports to be displayed on the mobile device of the user, each status report indicating a current state the baby is in of the plurality of different states at the time the status report is sent based on the analysis of the plurality of digital images along with a timestamp indicating a time at which the baby was in the current state.

* * * * *